United States Patent [19]

Akiyama et al.

[11] Patent Number: 5,256,518
[45] Date of Patent: Oct. 26, 1993

[54] INFORMATION STORAGE DISK EMPLOYING A REFLECTIVE LAYER HAVING GOOD MALLEABILITY

[75] Inventors: Tetsuya Akiyama; Hidemi Isomura, both of Osaka; Takeo Ohta, Nara; Shigeaki Furukawa, Shiki, all of Japan

[73] Assignee: Matsushita Electric Industrial Co., Ltd., Osaka, Japan

[21] Appl. No.: 874,228

[22] Filed: Apr. 27, 1992

Related U.S. Application Data

[63] Continuation of Ser. No. 396,214, Aug. 21, 1989, abandoned.

[30] Foreign Application Priority Data

Aug. 19, 1988 [JP] Japan .................. 63-207033

[51] Int. Cl.$^5$ ................... G03C 1/00; G03C 1/76
[52] U.S. Cl. .................... 430/273; 430/270; 430/271; 430/272; 430/495; 430/945; 346/135.1; 369/286
[58] Field of Search ............... 430/270, 495, 945, 271, 430/272, 273; 346/135.1; 369/286

[56] References Cited

U.S. PATENT DOCUMENTS 4,645,712  2/1987  Ishigaki et al. .............. 428/433
4,670,345  6/1987  Morimoto et al. ............. 430/495
4,725,502  2/1988  Kiyomiya et al. ............. 430/945
4,839,883  6/1989  Nagata et al. ............... 430/945
4,840,873  6/1989  Kobayashi et al. ............ 430/270
4,883,741 11/1989  Takahashi et al. ............ 430/270
5,075,145 12/1991  Yamamoto et al. ............ 430/495
5,093,174  3/1992  Suzuki et al. ............... 430/945
5,118,549  6/1992  Hausler et al. ............... 430/945

FOREIGN PATENT DOCUMENTS

0195532A1  9/1986  European Pat. Off. .
0316508A1  5/1989  European Pat. Off. .
3539351A1  5/1986  Fed. Rep. of Germany .

OTHER PUBLICATIONS

Patent Abstracts of Japan, The Patent Office Japanese Government, Aug., 16, 1988, vol. 12, No. 210 (P-717)(3057) p. 717, Jun. 16, 1988.

Primary Examiner—Charles L. Bowers, Jr.
Assistant Examiner—John S. Chu
Attorney, Agent, or Firm—Wenderoth, Lind & Ponack

[57] ABSTRACT

A phase change type information storage disk in which a reflective layer is formed of an alloy thin film comprising as a main component any one of Ni—Cr, Cr or Ti and a metal having a larger malleability than said main component, being easy to be initialized and strong to thermal shock.

9 Claims, 1 Drawing Sheet

INFORMATION STORAGE DISK EMPLOYING A REFLECTIVE LAYER HAVING GOOD MALLEABILITY

This application is a continuation of now abandoned application Ser. No. 07/396,214, filed on Aug. 21, 1989, now abandoned.

BACKGROUND OF THE INVENTION

1. Field of the Invention

The present invention relates to an information storage disk for recording, reproducing, and erasing information by irradiation of laser beam.

2. Description of Prior Art

Since the disclosure by S. R. Ovsinsky, et al. in U.S. Pat. No. 3,530,441 that the thin films of $Te_{85}EiGe_{15}$, $Te_{81}Ge_{15}S_2Sb_2$, etc. show reversible phase change by irradiation of laser beam and the like, there has been conducted development of an information storage disk using a chalcogenide alloy thin film as a recording layer by which recording, reproducing and erasing of information can be performed.

As one of the targets for development of the information storage disk of this type, there is a task to reduce the energy necessary for recording and erasing, i.e., to enhance sensitivity. British Patent Publication 2,079,031 specification discloses a tri-layer structure optical information recording medium made by inserting a spacer layer between the recording layer comprising a chalcogenide alloy thin film and a reflective layer comprising a metal thin film having large optical reflectivity such as Au, Al, etc. This is a means of enhancing optical absorptivity by utilizing the interference effect so as to obtain enhanced sensitivity. Further, Japanese Patent Publication (Unexamined) No. 63-9040/1988 specification discloses an optical information recording medium having the above-mentioned tri-layer structure, of which the reflective layer comprises Ni—Cr alloy thin film. This schemes, by using Ni—Cr alloy having small thermal diffusivity as a reflective layer, to reduce thermal diffusion to the surrounding at the laser beam irradiated part in recording and erasing and, by elevating the temperature of the recording layer in good efficiency, to enhance sensitivity.

However, there has been a problem that, when a Ni—Cr alloy is used as a reflective layer, the disk becomes weak to thermal shock. In the information storage disk for performing recording and erasing by phase change, in general, recording is performed by partial amorphization of recording layer, and erasing is performed by crystallization. This is because the amorphization is more suitable for forming a minute mark. However, as the recording layer has an amorphous phase in forming, it requires to be converted into a crystalline phase before use. This treatment is called an initialization. In order to effect good initialization in a short time, it is desirable to effect simultaneous initialization over a wide range by irradiating with a laser beam having a large spot diameter. However, when an information storage disk using Ni—Cr alloy as a reflective layer was initialized while rotating with an Ar laser having a spot diameter of about 40 μm and subjected to thermal shocks of charging in and taking out of a room with constant temperature kept at 90° C., cracks were generated on the reflective layer. It was due to the stress caused by the initialization and the expansion and shrinkage of each layer at the time of the exertion of the thermal shock, and is presumed to be attributed to the small malleability of the reflective layer.

SUMMARY OF THE INVENTION

An object of the present invention is to provide an information storage disk which has high sensitivity and still is free from crack even by initialization with a laser beam having large spot diameter and thermal shock, and has good weather resistance.

In order to attain the above object, in the present invention, the reflective layer is constructed by an alloy thin film comprising as a main component a metal selected from the group consisting of Ni—Cr, Cr and Ti and a metal having malleability larger than said main component.

Ni—Cr, Cr and Ti have practically sufficient optical reflectivity and small thermal diffusivity, but have common property of small malleability and aptness to cause cracks. By adding a malleable metal to such a material, there can be produced an information storage disk which can be initialized with a laser beam having large spot diameter, which is strong against thermal shock, and has good weather resistance. It is preferred for a malleable metal to be selected from Au, Ag, Pd, Pt, Al and Cu. The metals having large malleability such as Au include many of those having large thermal diffusivity. Accordingly, if such a metal is added in a large amount, thermal diffusivity of reflective layer becomes large, and the sensitivity of the information storage disk is lowered. Accordingly, in order to keep the effect of use of Ni—Cr or the like which has small thermal diffusivity for obtaining high sensitivity, the amount of addition of Au or the like is preferably not to be large.

DESCRIPTION OF THE PREFERRED EMBODIMENT

Figure 1:
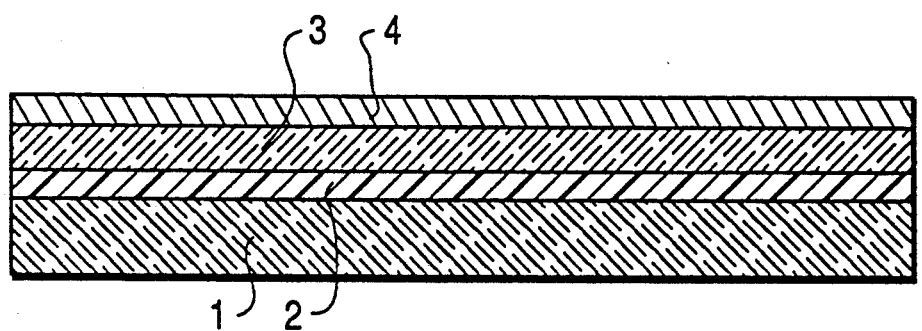
FIG. 1 and FIG. 2 are sectional views showing the structures of the information storage disk in the embodiments of the present invention.

The embodiment shown in FIG. 1 is constructed on a transparent substrate 1 comprising resin, glass, etc. a recording layer 2 comprising a substance which causes phase change such as a chalcogenide alloy thin film, a spacer layer 3 comprising a dielectric, and a reflective layer 4. The embodiment shown in FIG. 2 has more practical construction, in which there are provided on a disk form transparent substrate 1 having a central opening 8 an undercoat 5 comprising a dielectric, a recording layer 2, a spacer layer 3, and a reflective layer 4, and a protective substrate 7 is provided through an adhesive 6. The present invention is characterized by the material of the reflective layer, and the reflective layer 4 is composed of a thin layer of alloy comprising any of Ni—Cr, Cr, and Ti as a main component and a metal having a larger malleability than said main component.

Figure 2:
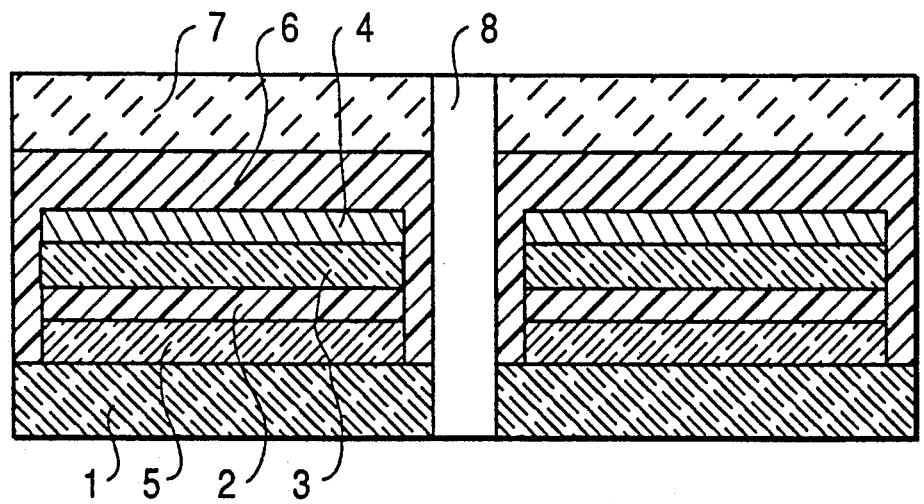

In order to testify the significance of the reflective layer material in the present invention, samples having the construction of FIG. 2 with change of the material of reflective layer only were tested for their strength against thermal shock and their recording sensitivity. Each sample was made by forming on a transparent substrate of polycarbonate resin an undercoat comprising ZnS having a thickness of about 1000Å, a recording layer comprising Te—Ge—Sb alloy having a thickness of about 400Å, a spacer layer comprising having a thickness of about 1700Å, and a reflective layer comprising various alloys having a thickness of about 400Å, and providing a protective substrate of polycarbonate resin through an adhesive comprising an ultraviolet light cured resin. The sample, while being rotated at 1,200 r.p.m., was initialized with Ar laser beam whose spot diameter was condensed to about 40 μm, and was subjected to repeated charging in and taking out of a room with constant temperature maintained at 90° C., and its strength against thermal shock was evaluated according to the generation or not of cracks. Also, the initialized sample, while being rotated at 1,800 r.p.m., was exposed to a semiconductor laser beam having a wavelength of 830 nm to evaluate its recording sensitivity according to the intensity of the laser beam necessary for amorphization. The results are shown in Tables 1 to 6. In each table, the mark ○ in the column of thermal shock resistance shows that there was no change in the aforementioned test, and the mark x shows that cracks were formed on the reflective layer. The mark ○ in the recording sensitivity column shows that the sensitivity was equivalent to the case where nothing was added to each main component of the reflective layer, and the mark x shows that the power of the laser beams necessary for recording increased by more than 15%.

Table 1 shows the results of evaluation on the alloys of Ni—Cr, Cr, and Ti in the case of Au being added. Tables 2 to 6 show the results of evaluation in the case of Ag, Cu, Al, Pd, and Pt being added in place of Au. It can be seen from these results that, when Au is selected as a metal having large malleability, the range of the addition amount which satisfies both the strength to thermal shock and the high recording sensitivity is 2-30 at % (atomic %) when the main component is Ni—Cr, 10-30 at % when it is Cr, and 5-30 at % when it is Ti. When Ag and Cu were selected as the metals having large malleability, the results turned out to be the same as in the case of Au. Preferred range of addition amount when Al is selected is 2-40 at % when the main component is Ni—Cr, 10-40 at % when it is Cr, and 5-40 at % when it is Ti. Preferred range of addition amount when Pd is selected is 2-50 at % when the main component is Ni—Cr, 10-50 at % when it is Cr, and 5-50 at % when it is Ti. When Pt was selected, the results were the same as in the case of Pd. The undercoat is provided to prevent damage of the transparent substrate by heat generated in recording and erasing. Depending on the material quality of the transparent substrate, however, this undercoat may be omitted. As the undercoat and spacer layer, ZnS was used, but other dielectric (e.g., $SiO_2$, $Si_3N_4$, a mixture of ZnS with $SiO_2$) may be used.

TABLE 1

| | Main component | | | | | |
|---|---|---|---|---|---|---|
| | Ni—Cr | | Cr | | Ti | |
| Au addition amount | Thermal Shock resist. | Recording sensitivity | Thermal Shock resist. | Recording sensitivity | Thermal shock resist. | Recording sensitivity |
| 1 at % | X | ○ | X | ○ | X | ○ |
| 2 at % | ○ | ○ | X | ○ | X | ○ |
| 5 at % | ○ | ○ | X | ○ | ○ | ○ |
| 10 at % | ○ | ○ | ○ | ○ | ○ | ○ |
| 20 at % | ○ | ○ | ○ | ○ | ○ | ○ |
| 30 at % | ○ | ○ | ○ | ○ | ○ | ○ |
| 40 at % | ○ | X | ○ | X | ○ | X |

TABLE 2

| | Main component | | | | | |
|---|---|---|---|---|---|---|
| | Ni—Cr | | Cr | | Ti | |
| Ag addition amount | Thermal Shock resist. | Recording sensitivity | Thermal Shock resist. | Recording sensitivity | Thermal shock resist. | Recording sensitivity |
| 1 at % | X | ○ | X | ○ | X | ○ |
| 2 at % | ○ | ○ | X | ○ | X | ○ |
| 5 at % | ○ | ○ | X | ○ | ○ | ○ |
| 10 at % | ○ | ○ | ○ | ○ | ○ | ○ |
| 20 at % | ○ | ○ | ○ | ○ | ○ | ○ |
| 30 at % | ○ | ○ | ○ | ○ | ○ | ○ |
| 40 at % | ○ | X | ○ | X | ○ | X |

TABLE 3

| | Main component | | | | | |
|---|---|---|---|---|---|---|
| | Ni—Cr | | Cr | | Ti | |
| Cu addition amount | Thermal Shock resist. | Recording sensitivity | Thermal Shock resist. | Recording sensitivity | Thermal shock resist. | Recording sensitivity |
| 1 at % | X | ○ | X | ○ | X | ○ |
| 2 at % | ○ | ○ | X | ○ | X | ○ |
| 5 at % | ○ | ○ | X | ○ | ○ | ○ |
| 10 at % | ○ | ○ | ○ | ○ | ○ | ○ |
| 20 at % | ○ | ○ | ○ | ○ | ○ | ○ |
| 30 at % | ○ | ○ | ○ | ○ | ○ | ○ |
| 40 at % | ○ | X | ○ | X | ○ | X |

TABLE 4

| Al addition amount | Main component | | | | | |
|---|---|---|---|---|---|---|
| | Ni—Cr | | Cr | | Ti | |
| | Thermal Shock resist. | Recording sensitivity | Thermal Shock resist. | Recording sensitivity | Thermal shock resist. | Recording sensitivity |
| 1 at % | X | O | X | O | X | O |
| 2 at % | O | O | X | O | X | O |
| 5 at % | O | O | X | O | O | O |
| 10 at % | O | O | O | O | O | O |
| 20 at % | O | O | O | O | O | O |
| 30 at % | O | O | O | O | O | O |
| 40 at % | O | O | O | O | O | O |
| 50 at % | O | X | O | X | O | X |

TABLE 5

| Pd addition amount | Main component | | | | | |
|---|---|---|---|---|---|---|
| | Ni—Cr | | Cr | | Ti | |
| | Thermal Shock resist. | Recording sensitivity | Thermal Shock resist. | Recording sensitivity | Thermal shock resist. | Recording sensitivity |
| 1 at % | X | O | X | O | X | O |
| 2 at % | O | O | X | O | X | O |
| 5 at % | O | O | X | O | O | O |
| 10 at % | O | O | O | O | O | O |
| 20 at % | O | O | O | O | O | O |
| 30 at % | O | O | O | O | O | O |
| 40 at % | O | O | O | O | O | O |
| 50 at % | O | O | O | O | O | O |
| 60 at % | O | X | O | X | O | X |

TABLE 6

| Pt addition amount | Main component | | | | | |
|---|---|---|---|---|---|---|
| | Ni—Cr | | Cr | | Ti | |
| | Thermal Shock resist. | Recording sensitivity | Thermal Shock resist. | Recording sensitivity | Thermal shock resist. | Recording sensitivity |
| 1 at % | X | O | X | O | X | O |
| 2 at % | O | O | X | O | X | O |
| 5 at % | O | O | X | O | O | O |
| 10 at % | O | O | O | O | O | O |
| 20 at % | O | O | O | O | O | O |
| 30 at % | O | O | O | O | O | O |
| 40 at % | O | O | O | O | O | O |
| 50 at % | O | O | O | O | O | O |
| 60 at % | O | X | O | X | O | X |

What is claimed is:

1. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Ni—Cr and 2 to 30 at % of Au or Ag or Cu.

2. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Ni—Cr and 2 to 40 at % of Al.

3. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Ni—Cr and 2 to 50 at % of Pd or Pt.

4. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Cr and 10 to 30 at % of Au or Ag or Cu.

5. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Cr and 10 to 40 at % of Al.

6. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Cr and 10 to 50 at % of Pd or Pt.

7. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Ti and 5 to 30 at % of Au or Ag or Cu.

8. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Ti and 5 to 40 at % of Al.

9. An information storage disk which has on a substrate a recording layer which reversibly causes an amorphous-crystal phase change under irradiation of light, a reflective layer comprising a metal layer for efficiently utilizing the irradiated light, and a spacer layer inserted between the recording layer and the reflective layer, the spacer layer being a layer of ZnS or SiO$_2$ or Si$_3$N$_4$ or a mixture of ZnS and SiO$_2$, wherein the reflective layer consists of an alloy of Ti and 5 to 50 at % of Pd or Pt.

* * * * *